(12) United States Patent
Burgermeister

(10) Patent No.: US 12,143,035 B2
(45) Date of Patent: Nov. 12, 2024

(54) FREQUENCY CONVERTER

(71) Applicant: Lenze Swiss AG, Romanshorn (CH)

(72) Inventor: Andreas Burgermeister, Mauren (CH)

(73) Assignee: Lenze Swiss AG, Romanshorn (CH)

( * ) Notice: Subject to any disclaimer, the term of this patent is extended or adjusted under 35 U.S.C. 154(b) by 249 days.

(21) Appl. No.: 17/778,629

(22) PCT Filed: Nov. 18, 2020

(86) PCT No.: PCT/EP2020/082580
§ 371 (c)(1),
(2) Date: Oct. 7, 2022

(87) PCT Pub. No.: WO2021/099414
PCT Pub. Date: May 27, 2021

(65) Prior Publication Data
US 2023/0024063 A1    Jan. 26, 2023

(30) Foreign Application Priority Data

Nov. 22, 2019  (DE) ...................... 10 2019 218 083.3

(51) Int. Cl.
*H02M 7/539*      (2006.01)
*H02M 1/32*       (2007.01)
(Continued)

(52) U.S. Cl.
CPC ........... *H02M 7/539* (2013.01); *H02M 1/325* (2021.05); *H02M 7/4826* (2013.01);
(Continued)

(58) Field of Classification Search
CPC ... H02M 7/4826; H02M 7/5375–5387; H02M 7/53875; H02M 7/539
See application file for complete search history.

(56) References Cited

U.S. PATENT DOCUMENTS

2006/0001392 A1\* 1/2006 Ajima ...................... H02P 6/10
318/432
2009/0102488 A1\* 4/2009 Morini ................... G01R 31/52
324/509
(Continued)

FOREIGN PATENT DOCUMENTS

CN         206773162 U   * 12/2017
DE      102016217874 A1  *  3/2018
WO    WO-2018079299 A1  *  5/2018  .............. H02M 3/28

OTHER PUBLICATIONS

German-language Office Action issued in German Application No. 10 2019 218 083.3 dated Mar. 25, 2021 (nine (9) pages).
(Continued)

*Primary Examiner* — Gary A Nash
(74) *Attorney, Agent, or Firm* — Crowell & Moring LLP

(57) ABSTRACT

A frequency converter, includes: a DC link, wherein the DC link has a first connection pole at which a positive link potential is present during operation of the frequency converter, and a second connection pole at which a negative link potential is present during operation of the frequency converter; an inverter, wherein the inverter has a first connection pole at which a positive inverter potential is present during operation of the frequency converter, and a second connection pole at which a negative inverter potential is present during operation of the frequency converter; a resistive shunt which is looped in between the first connection pole of the DC link and the first connection pole of the inverter; a differential amplifier which is designed to generate a test voltage from a potential difference across the resistive shunt; and an evaluation unit which is designed to detect a ground fault based on the test voltage.

8 Claims, 2 Drawing Sheets

(51) Int. Cl.
*H02M 7/48* (2007.01)
*H02M 7/5375* (2006.01)
*H02M 7/5387* (2007.01)

(52) U.S. Cl.
CPC ........ *H02M 7/5375* (2013.01); *H02M 7/5387* (2013.01); *H02M 7/53875* (2013.01)

(56) References Cited

U.S. PATENT DOCUMENTS

2009/0212733 A1\* 8/2009 Hsieh ...................... H02P 27/08
318/729
2010/0072980 A1\* 3/2010 Schmitt ............. H02M 7/53875
324/123 R

OTHER PUBLICATIONS

International Search Report (PCT/ISA/210) issued in PCT Application No. PCT/EP2020/082580 dated Feb. 11, 2021 with English translation (four (4) pages).
German-language Written Opinion (PCT/ISA/237) issued in PCT Application No. PCT/EP2020/082580 dated Feb. 11, 2021 (five (5) pages).

\* cited by examiner

FREQUENCY CONVERTER

BACKGROUND AND SUMMARY

The invention relates to a frequency converter.

The object of the invention is the provision of a frequency converter, which permits reliable and cost-effective ground fault detection.

The frequency converter conventionally comprises a DC voltage link, wherein the DC voltage link has a first connection pole at which, during the operation of the frequency converter, a positive link potential is present or is applied, and a second connection pole at which, during the operation of the frequency converter, a negative link potential is present or is applied. In this respect, reference may be made to the relevant specialized literature.

The frequency converter further comprises a conventional inverter, wherein the inverter has a first connection pole at which a positive inverter potential is present during the operation of the frequency converter, and a second connection pole at which a negative inverter potential is present during the operation of the frequency converter.

The frequency converter further comprises a resistive shunt, which is looped-in between the first connection pole of the DC voltage link and the first connection pole of the inverter.

The positive DV voltage link potential can correspond to the positive inverter potential, subject to the deduction of the voltage drop across the resistive shunt. The negative DC voltage link potential can correspond to the negative inverter potential, provided that there are no components in the current path between the negative DC voltage link potential and the negative inverter potential across which a voltage drop occurs.

The frequency converter further comprises a differential amplifier, which is designed to generate a test voltage from a potential difference across the resistive shunt.

The frequency converter further comprises an evaluation unit, which is designed to detect a ground fault on the basis of the test voltage. For example, the evaluation unit can detect a ground fault immediately the test voltage exceeds or undershoots a specified level, and/or immediately the test voltage assumes a pulse-shaped characteristic, etc.

According to one embodiment, the differential amplifier is designed to generate the test voltage using the negative DC voltage link potential as a reference potential. The test voltage can assume, for example, a level between 0 V and 3.3 V or 5 V.

According to one embodiment, the resistive shunt is dimensioned or has a resistance rating such that, in the event of a ground fault, the potential difference on the resistive shunt lies within a range of 50 mV to 500 mV. For example, the resistance rating of the resistive shunt can lie within a range of 1 mOhms to 20 mOhms.

According to one embodiment, the evaluation unit comprises a digital input, to which the test voltage is applied, wherein the differential amplifier is designed to generate a test voltage, in the absence of a ground fault, at a level which corresponds to a first logic level of the digital input, for example a logic level zero, and wherein the differential amplifier is designed to generate a test voltage, in the event of a ground fault, at a level which corresponds to a second logic level of the digital input, for example a logic level one.

According to one embodiment, the differential amplifier comprises the following: a first transistor, particularly a bipolar transistor, or a diode, and a second transistor, particularly a bipolar transistor, wherein the first transistor or the diode applies a bias to the second transistor, with respect to the switching performance thereof, such that, in the event of a ground fault, the second transistor alters its circuit state independently, if the potential difference across the resistive shunt is lower than 500 mV.

According to one embodiment, the second transistor is interconnected such that its AC voltage amplification is greater than its DC voltage amplification, by a factor of at least 10 to 20.

According to one embodiment, the first transistor and the second transistor are respectively bipolar transistors, in particular respectively pnp bipolar transistors, and the differential amplifier comprises the following: a first resistor and a first capacitor, which are looped-in in series between a first terminal of the resistive shunt and an emitter terminal of the second transistor, a second resistor, which is looped-in between the first terminal of the resistive shunt and the emitter terminal of the second transistor, a third resistor and a fourth resistor, which are looped-in in series between a collector terminal of the second transistor and the negative DC voltage link potential, a second capacitor, which is connected in parallel with the third resistor, and a fifth resistor, which is connected in parallel with the base-collector path of the second transistor.

According to one embodiment, the base terminal of the first transistor and the base terminal of the second transistor are electrically interconnected, the emitter terminal and the collector terminal of the first transistor are electrically interconnected, and a sixth resistor is looped-in in series between a second terminal of the resistive shunt and the emitter terminal of the first transistor.

If, for the purposes of temperature compensation, a diode is employed in place of the first transistor, the cathode of the diode and the base terminal of the second transistor are electrically interconnected, and a sixth resistor is looped-in in series between a second terminal of the resistive shunt and the anode of the diode.

According to one embodiment, the frequency converter comprises a test voltage generation circuit, which is designed to generate a test voltage with reference to a voltage drop across the fourth resistor.

The invention is described in detail hereinafter, with reference to the drawings.

DETAILED DESCRIPTION OF THE DRAWINGS

Figure 1:
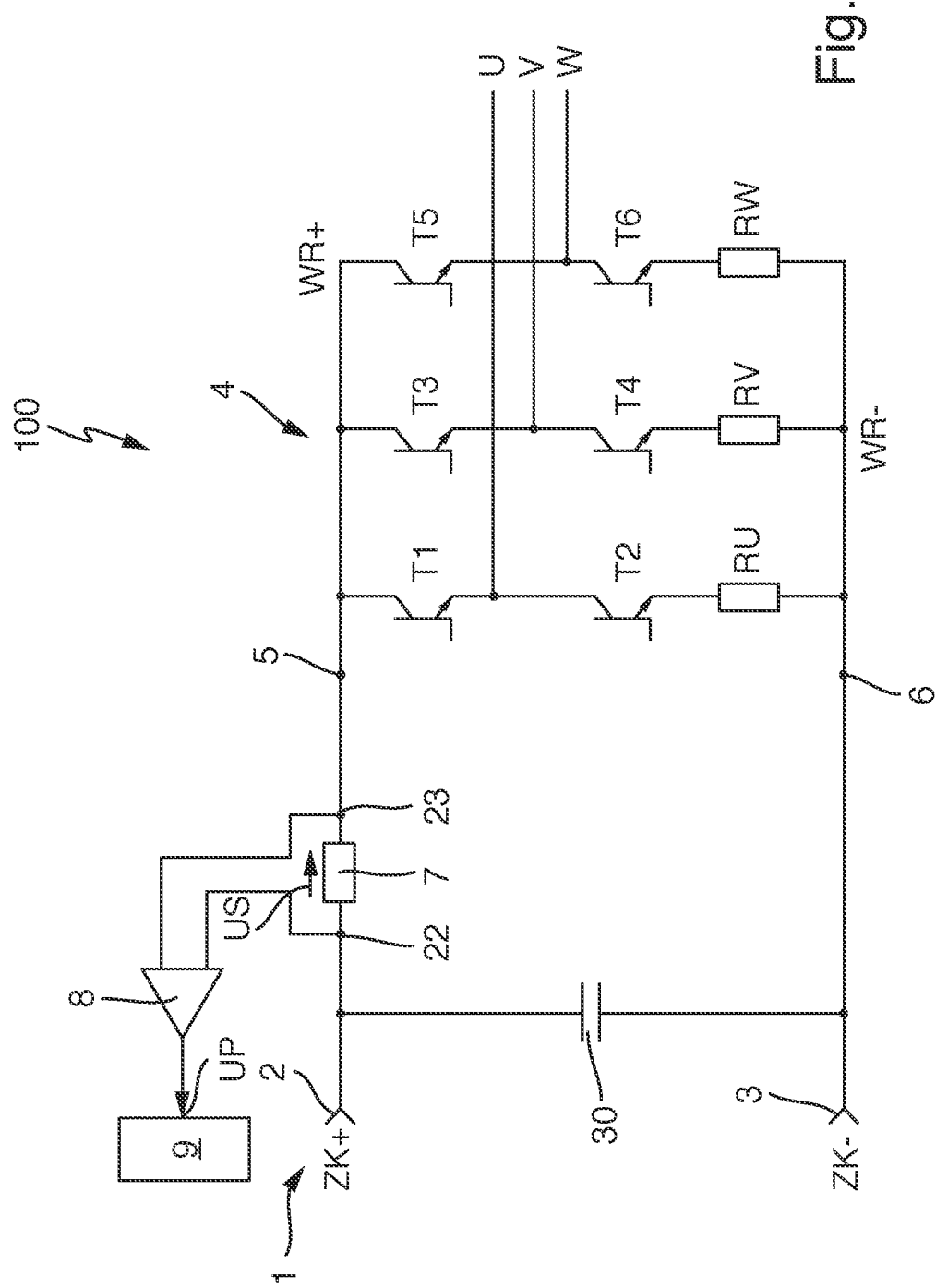
FIG. 1 is a schematic circuit diagram of a frequency converter according to an embodiment of the invention.

FIG. 1 shows a frequency converter 100, which conventionally comprises a DC voltage link 1 having a link capacitor 30, wherein the DC voltage link 1 has a first connection pole 2, at which a positive link potential ZK+ is present during the operation of the frequency converter 100, and has a second connection pole 3, at which a negative link potential ZK− is present during the operation of the frequency converter 100. A potential difference between the positive link potential ZK+ and the negative link potential ZK−, or a link voltage, can lie in the region of 800 V, for example.

The frequency converter 100 further comprises a conventional inverter 4, which comprises three half-bridges with associated semiconductor switches T1 to T6, for example in the form of IGBTs, and three resistive shunts RU, RV and RW for current measurement. The half-bridges generate conventional phase voltages U, V and W for a three-phase AC motor.

The inverter 4 comprises a first connection pole 5, at which a positive inverter potential WR+ is present during the operation of the frequency converter 100, and a second connection pole 6, at which a negative inverter potential WR− is present during the operation of the frequency converter 100. In the case represented, the potentials ZK− and WR− are identical.

The frequency converter 100 further comprises a resistive shunt 7 having a resistance rating of 10 mOhms, which is looped-in between the first connection pole 2 of the DC voltage link 1 and the first connection pole 5 of the inverter 4.

The frequency converter 100 further comprises a differential amplifier 8, which is designed, from a potential difference US across the resistive shunt 7, to generate a test voltage UP which, for example, assumes a pulse-shaped characteristic in the event of a ground fault.

The frequency converter 100 further comprises an evaluation unit 9, which is designed to detect a ground fault on the basis of the test voltage UP or the temporal characteristic thereof.

Figure 2:
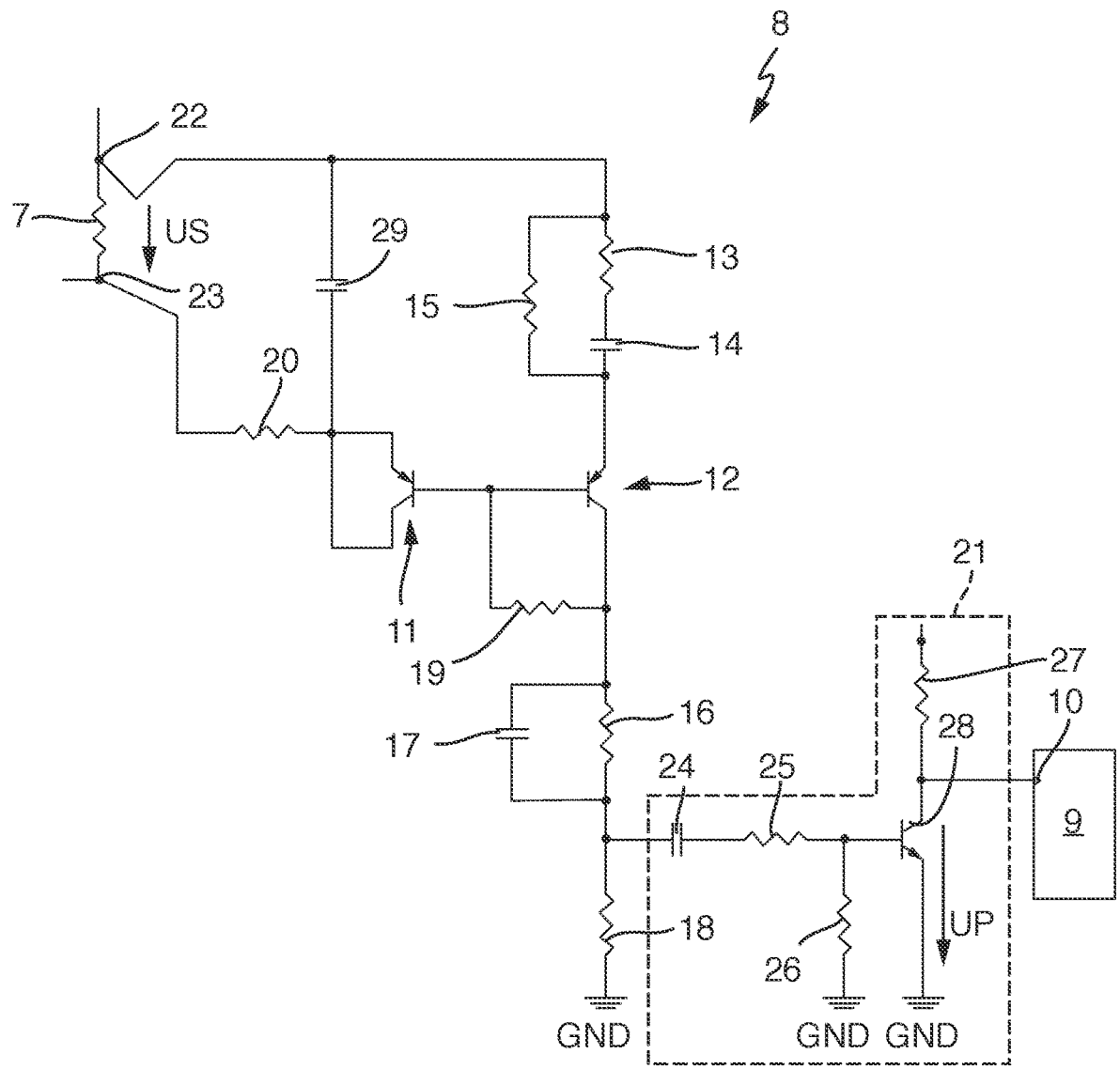
FIG. 2 is a detailed circuit diagram of a differential amplifier, a test voltage generation circuit and an evaluation unit of the frequency converter represented in FIG. 1.

The differential amplifier 8 is designed to generate the test voltage UP, using the negative link potential ZK−, designated in FIG. 2 as GND, as a reference potential.

The resistive shunt 7 is dimensioned such that, in the event of a ground fault, the potential difference US across the resistive shunt 7 lies within a range of 50 mV to 500 mV.

With reference to FIG. 2, the evaluation unit 9 comprises a digital input 10, to which the test voltage UP is applied. The differential amplifier 8 generates a test voltage UP, in the absence of a ground fault, at a level which corresponds to a first logic level of the digital input 10, and generates a test voltage UP, in the event of a ground fault, at a level which corresponds to a second logic level of the digital input 10.

With reference to FIG. 2, the differential amplifier 8 comprises a first pnp bipolar transistor 11 and a second pnp bipolar transistor 12, wherein the first transistor 11 applies a bias to the second transistor 12 such that, in the event of a ground fault, the second transistor 12 alters its circuit state independently, if the potential difference US across the resistive shunt 7 is lower than 500 mV.

The second transistor 12 is interconnected such that its AC voltage amplification is greater than its DC voltage amplification, by at least a factor of 100.

The differential amplifier 8 comprises a first resistor 13 and a first capacitor 14, which are looped-in in series between a first terminal 22 of the resistive shunt 7 and an emitter terminal of the second transistor 12.

The differential amplifier 8 further comprises a second resistor 15, which is looped-in between the first terminal 22 of the resistive shunt 7 and the emitter terminal of the second transistor 12.

The differential amplifier 8 further comprises a third resistor 16 and a fourth resistor 18, which are looped-in in series between a collector terminal of the second transistor 12 and the negative link potential ZK− or GND.

The differential amplifier 8 further comprises a second capacitor 17, which is connected in parallel with the third resistor 16.

The differential amplifier 8 further comprises a fifth resistor 19, which is connected in parallel with the base-collector path of the second transistor 12.

The base terminal of the first transistor 11 and the base terminal of the second transistor 12 are electrically interconnected.

The emitter terminal and the collector terminal of the first transistor 11 are electrically interconnected The differential amplifier 8 further comprises a sixth resistor 20, which is looped-in in series between a second terminal 23 of the resistive shunt 7 and the emitter terminal of the first transistor 11.

A test voltage generation circuit 21 is designed to generate the test voltage UP from a voltage drop across the fourth resistor 18. To this end, the test voltage generation circuit 21 comprises a capacitor 24, resistors 25, 26 and 27 and a transistor 28, in the circuit arrangement represented.

A capacitor 29 is connected in parallel with the resistive shunt 7.

By means of the invention, protection against a ground fault on the motor outputs of a frequency converter, including short-circuit protection on a braking chopper output, is possible by the measurement of the link current in the ZK+ branch, by means of the resistive shunt 7.

Given that, in emitter shunt current measurement by means of the resistive shunts RU, RV and RW, the motor phase current is only measured at the ZK− potential, a ground fault on the motor phases, in service, can only be conditionally detected. If a ground fault occurs during the conductive phase of an upper IGBT T1, T3, T5, the power circuit will be destroyed. Thus, according to the invention, a sensor system is provided, in the interests of secure ground fault detection in the ZK+ current path.

However, as the evaluation unit 9 is at the ZK− or ground potential GND, it is necessary for the voltage drop US across the resistive shunt 7 to be generated for the purposes of evaluation vis-à-vis ZK− or GND.

A higher current flowing in the ZK+ path in response to a ground fault is converted by means of the resistive shunt 7 into the voltage US. Given that, in the interests of limiting power losses, it is necessary for the ohmic rating of the resistive shunt 7 to be selected with the lowest possible value, in the event of a ground fault, only a small voltage drop of the order of 100 to 200 mV occurs across the resistive shunt 7. This voltage drop is not sufficient to directly actuate an optocoupler or bipolar transistor.

For this reason, a bias is applied to the base voltage of the transistor 12 by means of the transistor 11. As the preferred ohmic resistance value of the resistor 20 is substantially lower than the resistance value of the resistor 15, a bias current primarily flows through the transistor 12. A high voltage drop, of the order of 200 V, thus occurs across the resistor 19.

In the event of the occurrence of a ground fault, the transistor 11 immediately assumed a blocking state, in response to which the transistor 12 becomes highly conductive. As a result of the capacitor 17, the resulting voltage pulse is transmitted to the lower voltage potential ZK− or GND, and the transistor 28 then refers the short-circuit signal to the evaluation unit 9.

Theoretically, it might be possible for the resulting voltage pulse to be transmitted even in the absence of the capacitor 17, although a transistor (pnp or p-channel MOSFET) with a higher blocking voltage and high voltage clearances would need to be employed for this purpose.

According to the invention, the resistance ratings of the resistors employed are selected such that the voltage drop across the transistor 12, at a link voltage of 800 V, does not exceed a maximum 210 V, with a corresponding voltage of 590 V to 800 V on the capacitor 17. The capacitor 17 is thus essential to the insulating clearance and signal transmission. However, as the latter is only required to assume a capacitance, for example, of 470 pF, it can be a highly cost-effective and small component. A small and cost-effective transistor can be employed as the transistor 12.

According to the invention, no galvanic isolation is required between the resistive shunt 7 and the evaluation unit 9. Moreover, no differential amplifier with a power supply at the ZK+ potential is required. Moreover, the differential amplifier 8 can be constituted using cost-effective standard components, such that no specific ICs or sensors are required.

The invention claimed is:

1. A frequency converter, comprising:
a DC voltage link, wherein the DC voltage link has a first connection pole at which, during operation of the frequency converter, a positive link potential is present, and a second connection pole at which, during the operation of the frequency converter, a negative link potential is present;
an inverter, wherein the inverter has a first connection pole at which a positive inverter potential is present during the operation of the frequency converter, and a second connection pole at which a negative inverter potential is present during the operation of the frequency converter;
a resistive shunt, which is looped-in between the first connection pole of the DC voltage link and the first connection pole of the inverter;
a differential amplifier, which is designed to generate a test voltage from a potential difference across the resistive shunt, and
an evaluation unit, which is designed to detect a ground fault on the basis of the test voltage, wherein
the differential amplifier is designed to generate the test voltage using the negative link potential as a reference potential.

2. The frequency converter according to claim 1, wherein the resistive shunt is dimensioned such that, in an event of a ground fault, the potential difference on the resistive shunt lies within a range of 50 mV to 500 mV.

3. A frequency converter, comprising:
a DC voltage link, wherein the DC voltage link has a first connection pole at which, during operation of the frequency converter, a positive link potential is present, and a second connection pole at which, during the operation of the frequency converter, a negative link potential is present;
an inverter, wherein the inverter has a first connection pole at which a positive inverter potential is present during the operation of the frequency converter, and a second connection pole at which a negative inverter potential is present during the operation of the frequency converter;
a resistive shunt, which is looped-in between the first connection pole of the DC voltage link and the first connection pole of the inverter;
a differential amplifier, which is designed to generate a test voltage from a potential difference across the resistive shunt, and
an evaluation unit, which is designed to detect a ground fault on the basis of the test voltage, wherein
the evaluation unit has a digital input, to which the test voltage is applied,
the differential amplifier is designed to generate the test voltage, in the absence of a ground fault, at a level which corresponds to a first logic level of the digital input, and
the differential amplifier is designed to generate the test voltage, in the event of a ground fault, at a level which corresponds to a second logic level of the digital input.

4. A frequency converter, comprising:
a DC voltage link, wherein the DC voltage link has a first connection pole at which, during operation of the frequency converter, a positive link potential is present, and a second connection pole at which, during the operation of the frequency converter, a negative link potential is present;
an inverter, wherein the inverter has a first connection pole at which a positive inverter potential is present during the operation of the frequency converter, and a second connection pole at which a negative inverter potential is present during the operation of the frequency converter;
a resistive shunt, which is looped-in between the first connection pole of the DC voltage link and the first connection pole of the inverter;
a differential amplifier, which is designed to generate a test voltage from a potential difference across the resistive shunt, and
an evaluation unit, which is designed to detect a ground fault on the basis of the test voltage, wherein
the differential amplifier comprises:
a first transistor or a diode; and
a second transistor,
wherein the first transistor or the diode applies a bias to the second transistor such that, in an event of a ground fault, the second transistor alters its circuit state independently, when the potential difference across the resistive shunt is lower than 500 mV.

5. The frequency converter according to claim 4, wherein the second transistor is interconnected such that its AC voltage amplification is greater than its DC voltage amplification, by a factor of at least 100.

6. The frequency converter according to claim 4, wherein the first transistor and the second transistor are respectively bipolar transistors, and the differential amplifier comprises:
a first resistor and a first capacitor, which are looped-in in series between a first terminal of the resistive shunt and an emitter terminal of the second transistor,
a second resistor, which is looped-in between the first terminal of the resistive shunt and the emitter terminal of the second transistor,
a third resistor (and a fourth resistor, which are looped-in in series between a collector terminal of the second transistor and the negative link potential,
a second capacitor, which is connected in parallel with the third resistor, and
a fifth resistor, which is connected in parallel with the base-collector path of the second transistor.

7. The frequency converter according to claim 6, further comprising:
a test voltage generation circuit, which is designed to generate the test voltage with reference to a voltage drop across the fourth resistor.

8. The frequency converter according to claim 4, wherein
the base terminal of the first transistor and the base terminal of the second transistor are electrically interconnected,
the emitter terminal and the collector terminal of the first transistor are electrically interconnected, and a sixth resistor is looped-in in series between a second terminal of the resistive shunt and the emitter terminal of the first transistor.

* * * * *